United States Patent
Shiozaki et al.

[11] Patent Number: 5,921,726
[45] Date of Patent: Jul. 13, 1999

[54] MACHINE TOOL WITH WORN-DETECTION FUNCTION FOR TOOL

[75] Inventors: Masahito Shiozaki, Shizuoka-ken; Takeshi Momochi, Numazu; Hideo Fujie; Kazuo Nagashima, both of Shizuoka-ken, all of Japan

[73] Assignee: Toshiba Kikai Kabushiki Kaisha, Tokyo, Japan

[21] Appl. No.: 08/837,725

[22] Filed: Apr. 22, 1997

[30] Foreign Application Priority Data

Apr. 23, 1996 [JP] Japan ................................. 8-101326

[51] Int. Cl.⁶ ........................................... B23B 39/00
[52] U.S. Cl. .................................... 408/6; 364/474.17
[58] Field of Search ..................... 408/6, 5, 11, 10; 364/474.17; 313/798–815, 438, 650; 73/104

[56] References Cited

U.S. PATENT DOCUMENTS

| | | | |
|---|---|---|---|
| 4,478,538 | 10/1984 | Kakino | 408/6 |
| 4,694,686 | 9/1987 | Fildes et al. | 408/6 |
| 4,869,626 | 9/1989 | Kosmowski | 408/235 |
| 5,010,794 | 4/1991 | Klager | 409/231 |
| 5,243,533 | 9/1993 | Takagi et al. | 364/474.17 |
| 5,257,531 | 11/1993 | Motosugi et al. | 408/6 |
| 5,407,265 | 4/1995 | Hamidieh et al. | 364/474.17 |
| 5,579,232 | 11/1996 | Tong et al. | 364/474.17 |
| 5,689,062 | 11/1997 | Jawahir et al. | 364/474.17 |
| 5,691,611 | 11/1997 | Kojima et al. | 318/798 |

FOREIGN PATENT DOCUMENTS

| | | | |
|---|---|---|---|
| 114803 | 7/1983 | Japan | 408/124 |
| 131855 | 6/1986 | Japan | 408/6 |
| 632647 | 1/1988 | Japan | 408/6 |
| 1177120 | 9/1985 | Sweden | 409/231 |

Primary Examiner—Andrea L. Pitts
Assistant Examiner—Adesh Bhargava
Attorney, Agent, or Firm—Finnegan, Henderson, Farabow, Garrett & Dunner, L.L.P.

[57] ABSTRACT

A machine with a worn detection function for a tool capable of reliably carrying out a worn detection for a tool. A present consumption power PW1 of a built-in motor 19, driving a main shaft 11, is watched and compared with a reference consumption power PW2, previously defined, by using a load meter 31, an A/D converter 32, a comparator 33 and a processing unit 34, thereby wear on the tool 12 is detected when the consumption power PW1 is larger than the reference consumption power PW2 as a cutting process is advanced. The main shaft 11 is supported by air static-pressure bearings 14 to 18, so that noise created with rotating, which exert an influence upon the consumption-power detected value, is extremely smaller as compared with the conventional antifriction bearing and so on. Thereby allowing delicate fluctuation of the consumption power to be detected, and naturally the worn detection for the tool 12 to be ensured.

9 Claims, 8 Drawing Sheets

MACHINE TOOL WITH WORN-DETECTION FUNCTION FOR TOOL

BACKGROUND OF THE INVENTION

1. Field of the Invention

This invention relates to a machine tool with a worn-detection function for a tool, more particularly, to a machine tool in which wearing, produced one after another in process of multiple work pieces, can be detected.

2. Description of the Related Art

Conventionally, a machine tool is used for, for example, cutting various metallic materials.

The machine tool has a cutting tool attached at the end of a main shaft rotatably supported, in which the tool is rotated by rotatably driving the main shaft with a shaft driving motor, thereby performing a cutting process for a work piece.

Support for the Main Shaft

The conventional machine tool uses various bearing for rotatably supporting the main shaft.

For example, an antifriction bearing or the like is heavily used for the machine tool for cutting a heavy work piece having large cut-load.

An air static-pressure bearing is used for the machine tool for carrying out a ultra-precise cutting process of small cut-load (e.g., in the case of a mirror finish of light-metal material by using diamond bit or other cases).

Wear of the Tool

The tool used in the machine tool is worn or caused with the other damages through the cutting processes, and sometimes results in a break of the tool. And, sometimes, the aforementioned wear or the like causes precision of a processed part of the work piece to be decreased, and performance of the required process to be impossible.

Therefore, in addition to measures, for example, which an operator inspects for wear and the like on the tool as necessary, in order to attain a consecutively automatic process operation, the machine tool in which wear or the like occurred on the tool is automatically detected is proposed by the present applicant (see Japanese Patent Application Publication No. Sho 62-60221).

In the aforementioned machine tool, the worn detection has two ways of the use of current consumption of the shaft driving motor and the use of sensing vibration created in proximity to the main shaft.

Determination by Using Current Consumption

In order to determine by using current consumption, an unload current value iNUL of an unload state (in which the tool does not cut a work piece) and a normally cutting current value iNET in the use of a new tool are defined by properly detecting a current value iR of a motor, rotatably driving the main shaft. With the aforementioned current values, the increment of current (iNET-iNUL), increased when the normal cutting process is performed with the new tool, and the increment of current (iR-iNUL) in the actual cutting process are compared, thereby the wear on the tool is determined to occur when the increment of current in the actual cutting process is larger.

Each of the aforementioned current values is obtained from mean of multiple sampling values.

Determination by Sensing Vibration

In order to determine by sensing vibration, a piezoelectric element or the like is provided as a vibration detection element in proximity to the main shaft, thereby faulty process with wear or break is determined when a signal, obtained from the aforementioned element, exceeds the base value.

In the vibration determination as described above, it is required to be insensitive to various vibrations (a bearing, a motor and so on) naturally created in the machine tool. Therefore, the vibration determination uses a filter circuit for removing the aforementioned vibration components.

However, the detection of delicate wear is difficult, that is to say the vibration determination is limited to determine that chipping, break and so on occur on the tool.

Disadvantages of the Worn-detection for the Tool

The aforementioned automatic tool-worn detection is under the circumstances that the required detection of wear on the tool is insufficient.

In other words, in the aforementioned machine tool, where the bearing supporting the main shaft is an antifriction bearing, the antifriction bearing causes noise to create in a driving current detected value of the motor, so that brake of the tool or the like, which are easily represented as fluctuation, can be detected. Concerning the wear which a fluctuation signal is smaller, but, there is a disadvantage the reliable detection is difficult because of noise.

Therefore, in the conventional machine tool for cutting, the heavy work piece to require the antifriction bearing, the worn-detection for the tool is uncertain, thus producing a disadvantage an automatic operation without operators for a long time is impossible.

It is an object to provide the machine tool with the worn-detection function for the tool, which is capable of reliably detecting wear on the tool.

SUMMARY OF THE INVENTION

The present invention is intended to attain to ensure detection of wear by decreasing noise with the use of an air static-pressure bearing for supporting a main shaft.

Conventionally, the air static-pressure bearing is used for only a cutting process for small load, but the present applicant verified by experiments that it is possible to apply the use of the air static-pressure bearing to the cutting process for large load. The present invention is resulted to be structured by grounding on knowledge that the air static-pressure bearing is most appropriate for the worn detection for the tool in view of low-noise of the air static-pressure bearing.

Concretely, the machine tool with a worn detection function for a tool is characterized by including: a main shaft attached with the tool and supported by an air static-pressure bearing to be rotated; a shaft driving motor driving the main shaft to rotate; a consumption-power detection means for detecting consumption power of the shaft driving motor; and a worn-detection means for detecting wear on the tool by memorizing a reference consumption power of the shaft driving motor and comparing the reference consumption power with consumption power detected by the consumption-power detection means.

In the present invention described above, the actual consumption power of the shaft driving motor is detected by the consumption-power detection means, and the detected actual consumption power is passed to the worn-detection means and compared with a stored reference consumption power. When the driving load of the main shaft becomes large by decreasing a cut property for a work piece because of the worn tool, the consumption power is larger. As a result, when the consumption power is larger than the reference consumption power by being compared in the worn-detection means, the wear of the tool is detected.

At this time, the main shaft is supported by the air static-pressure bearings, so that noise created with rotating, which exert an influence upon the consumption-power detected value, is extremely smaller as compared with the conventional antifriction bearing and so on. Thereby allowing delicate fluctuation of the consumption power to be detected, and naturally the worn detection for the tool to be ensured.

It is advisable that the worn-detection means has a cut-starting detector detecting the start of a cutting process for a predetermined work piece by using the consumption power obtained from the consumption-power detection means; a reference-value stored area storing the consumption power of the shaft driving motor during the cutting process for the predetermined work piece as time-series values in elapsed-time from the start of the cutting process, and outputting the reference consumption power of the time points; an accord controller fetching the reference consumption power corresponding to the present time from the reference-value stored area, based on the elapsed-time from the start of the cutting process, detected by the cut-starting detector, to the present time; and a comparing area comparing the reference consumption power fetched by the accord controller, with the present consumption power obtained from the consumption-power detection means.

According to the above description, the comparison of the reference value and actual vale of the consumption power can be carried out under the same conditions in a sequence of the process, thus allowing the worn detection to ensure as compared with the use of an average value under various conditions, an average value of multiple processes, or the like.

It is advisable that the reference-value stored area and the accord controller store and fetch the reference consumption power at every predetermined sampling time inputted from the outside.

Therefore, the calculating process and so on can be simplified as compared with a process with continuous values in addition to ensuring the accuracy of the detection at time of each of sampling.

The worn-detection means may memorize an admissible differential value, inputted from the outside, and determine that the tool is worn when a difference of the consumption power detected by the consumption-power detection means and the reference consumption power is larger than the admissible differential value.

The above structure shows that it allows a sensing control of the worn detection, using the comparison with the reference consumption power, and so on to be easily carried out by means of changing the setting of the predetermined admissible differential value.

It is advisable that the worn-detection means memorize the consumption power, obtained from the consumption-power detection means, as the reference consumption power when the first cutting process for a predetermined work piece is carried out.

According to the above description, even when the steps for processing the work piece are diversified or it is difficult to previously define the reference value, the reference value can be defined every time, thus reliably and properly performing the worn detection.

The worn-detection means may memorize the consumption power, obtained from the consumption-power detection means, as the new reference consumption power in each of cutting processes for the predetermined work piece.

The above description shows that the comparison can be performed in dependence on the preceding process, thus being the structure suitable for the breakage detection creating a large fluctuation.

DETAILED DESCRIPTION OF THE PREFERRED EMBODIMENT(S)

The preferred embodiment according to the present invention will be explained below with reference to the attached drawings.

Basic Structure

Figure 1:
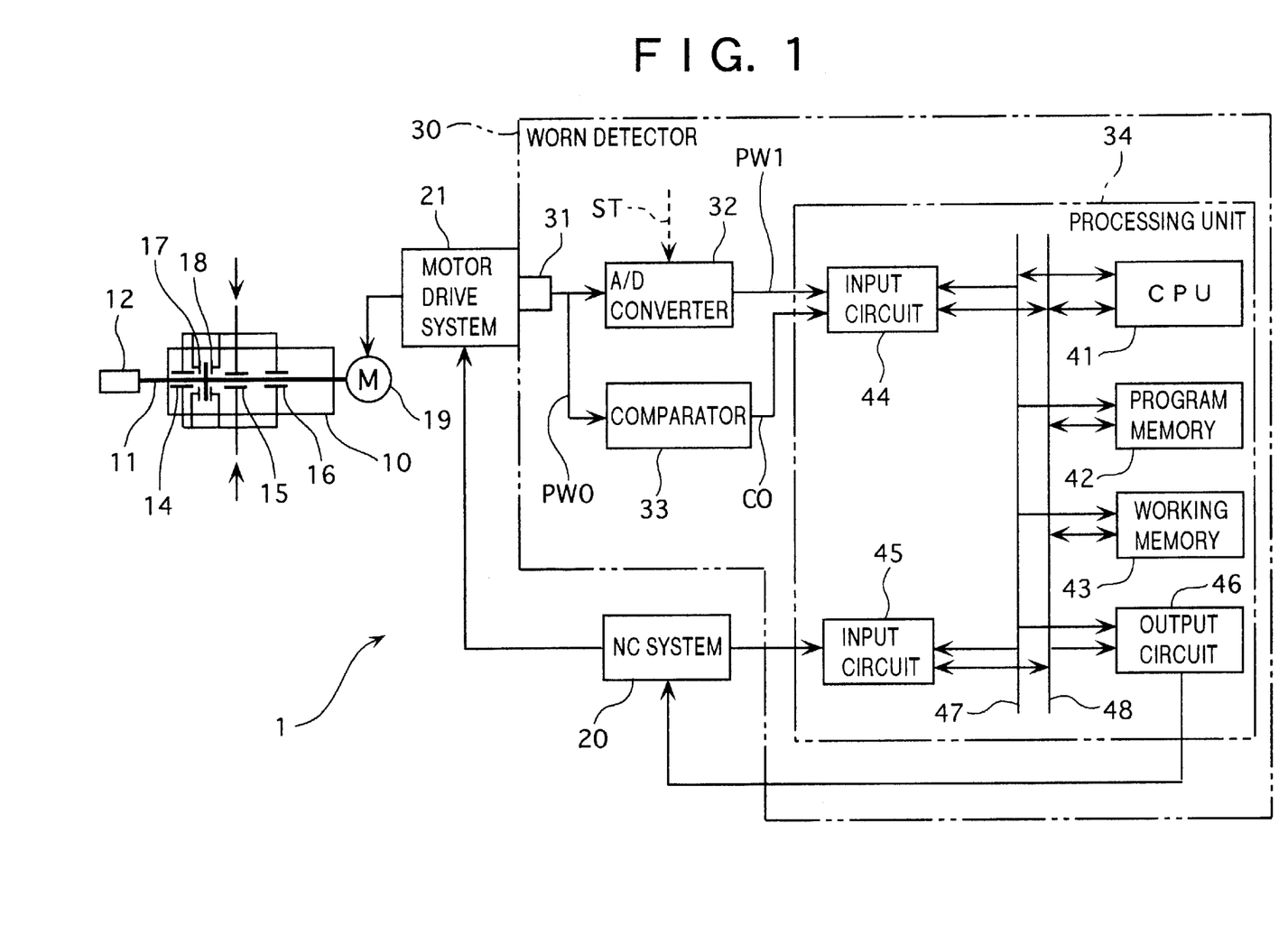
FIG. 1 is a block diagram showing the preferred embodiment according to the present invention.

In FIG. 1, a machine tool 1 of the embodiment has a shaft head 10, supported by a column (not shown), and a cutting tool 12 provided at the end of a main shaft 11 rotatably supported in the shaft head 10. Further the machine tool 1 has a table and so on (not shown) for placing a work piece. The table and so on and the shaft head 10 are three-dimensionally and relatively moved by a moving system (not shown), thereby the tool 12 is touched to the work piece so as to perform a cutting process.

The aforementioned movement is carried out based on a operating instruction sent from a NC system 20. As the NC system 20, an existing system is used, in which various operating instructions are outputted based on predetermined process programs.

The shaft head 10 uses an air static-pressure bearing in order to support the main shaft 11.

The main shaft 11 has a flange 13 at a part in the shaft head 10, and the air static-pressure bearings 14, 15 and 16, of which one of the bearings is located in front of the flange 13 towards the tool 12 in the radial direction and two of the bearings are located at positions behind the flange 13 in the radial direction. Further, a pair of air static-pressure bearings 17 and 18 are provided in the axial direction to sandwich the flange 13.

High-pressure air is supplied to the aforementioned air static-pressure bearings 14 to 18, in which the main shaft 11 is floatingly supported with a predetermined bearing-clearance in each of the bearings 14 to 18 so as to be supported to be rotated in the radial direction and the axial direction in the shaft head 10.

From the tool 12 on the opposite side of the shaft head 10, a built-in motor 19 is attached, thereby the main shaft 11 is rotatably driven.

The built-in motor 19 is an induction motor, and controlled by a motor drive system 21 as a motor control circuit. The motor drive system 21 controls the built-in motor 19 based on the operating instruction sent from the NC system 20 to rotate the main shaft 11 and the tool 12 at a predetermined rotational speed.

Worn-detector

The machine tool 1 includes a worn detector 30, detecting wear, as well as the aforementioned shaft head 10 and NC system 20.

The worn detector 30, in turn, includes a load-meter 31 as consumption-power detection means, and an A/D converter 32, a comparator 33 and a processing unit 34 as worn-detection means.

The load-meter 31 is a circuit designed in the motor drive system 21 to detect consumption power of the built-in motor 19.

The A/D converter 32 convert an analog consumption power signal PW0, sent from the load-meter 31, to a digital consumption power signal PW1 (see FIG. 3) in sequence based on a sampling-signal ST (a sampling-cycle Ts), inputted from the outside.

The comparator 33 determines whether the machine tool 1 is in the cutting state or not by comparing the consumption power signal PW0 sent from the load-meter 31 with a predetermined threshold value, and then outputs an ongoing-cutting signal CO (see FIG. 3) when the cutting process is carried out.

More specifically, the consumption power of the built-in motor 19 is large in the cutting process due to the load, and small in the not-cutting process, so that the ongoing cutting process or the start or end of the cutting process can be detected from the consumption power.

In turn, the processing unit 34, which is a small-scale computer system using a CPU 41 as a microprocessor, includes a program memory 42, a working memory 43, an input circuits 44 and 45, and an output circuit 46.

The program memory 42 stores an operation program of a CPU 41, and the working memory 43 is appropriately used when the CPU 41 carries out the process. The memory 42 and memory 43 are each composed of existing memory cell and so on.

The input circuit 44 receives outputs from the A/D converter 32 and the comparator 33. The input circuit 45 receives signals, such as a set point or the like, from the NC system 20. And the output circuit 46 outputs signals to the outside. The aforementioned circuits are each composed of an I/O interface circuit and so on.

Each of the aforementioned memories and circuits 41 to 46 are connected to an address bus 47 and a data bus 48 to perform a cooperative operation, such as reciprocally passing data and so on.

In the processing unit 34, the CPU 41 operates in dependence on the operation program, thereby a function, required for the worn detection process in respect of software, is achieved.

Functional Structure of the Processing Unit

Figure 2:
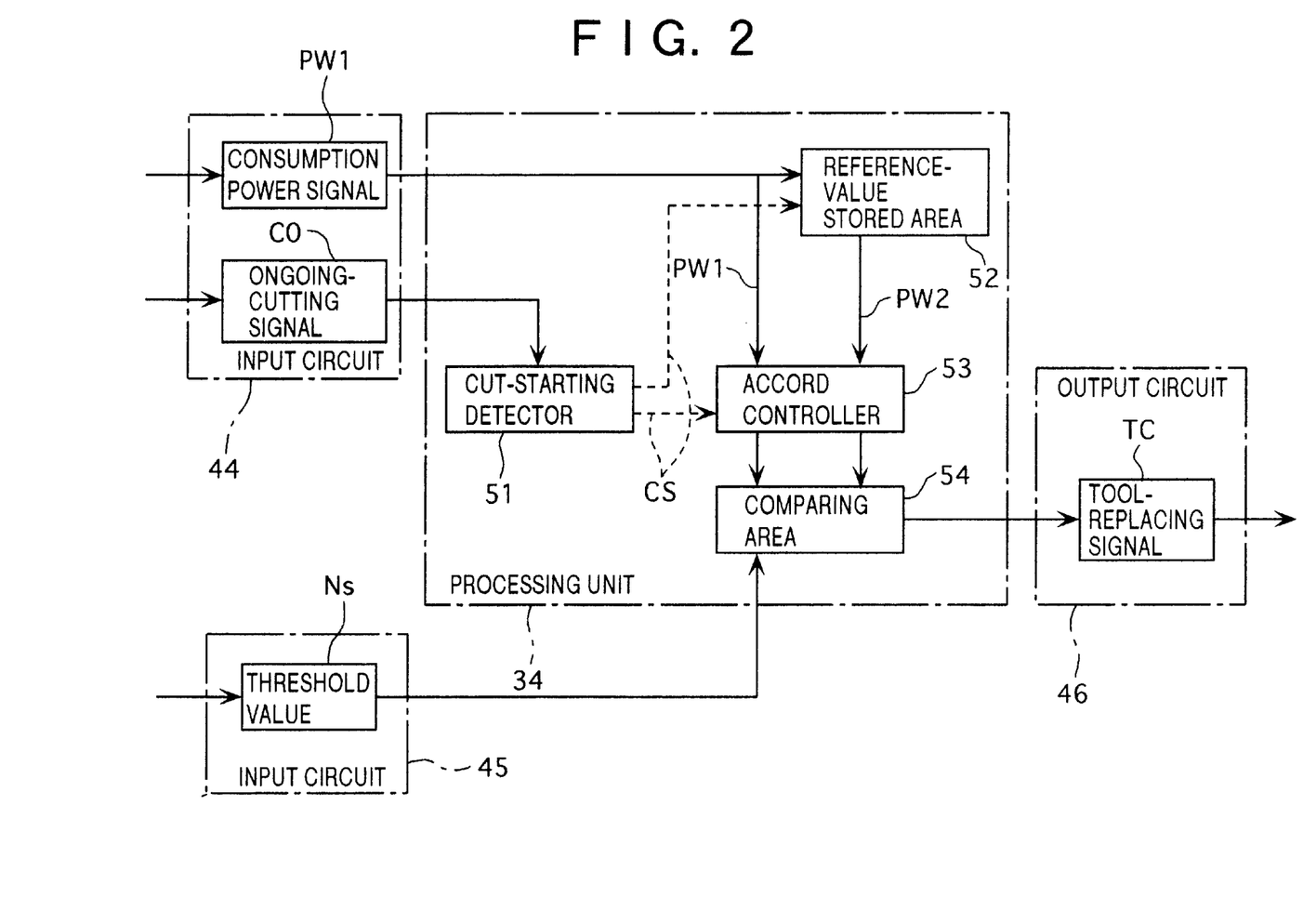
FIG. 2 is a fragmentary block diagram showing the preferred embodiment.

In FIG. 2, the processing unit 34 is composed of a cut-starting detector 51, a reference-value stored area 52, an accord controller 53 and a comparing area 54.

The cut-starting detector 51 detects the start of the cutting process by detecting leading edge on the ongoing-cutting signal CO, inputted into the input means 44, and outputs a cut-starting point signal CS.

Figure 3:
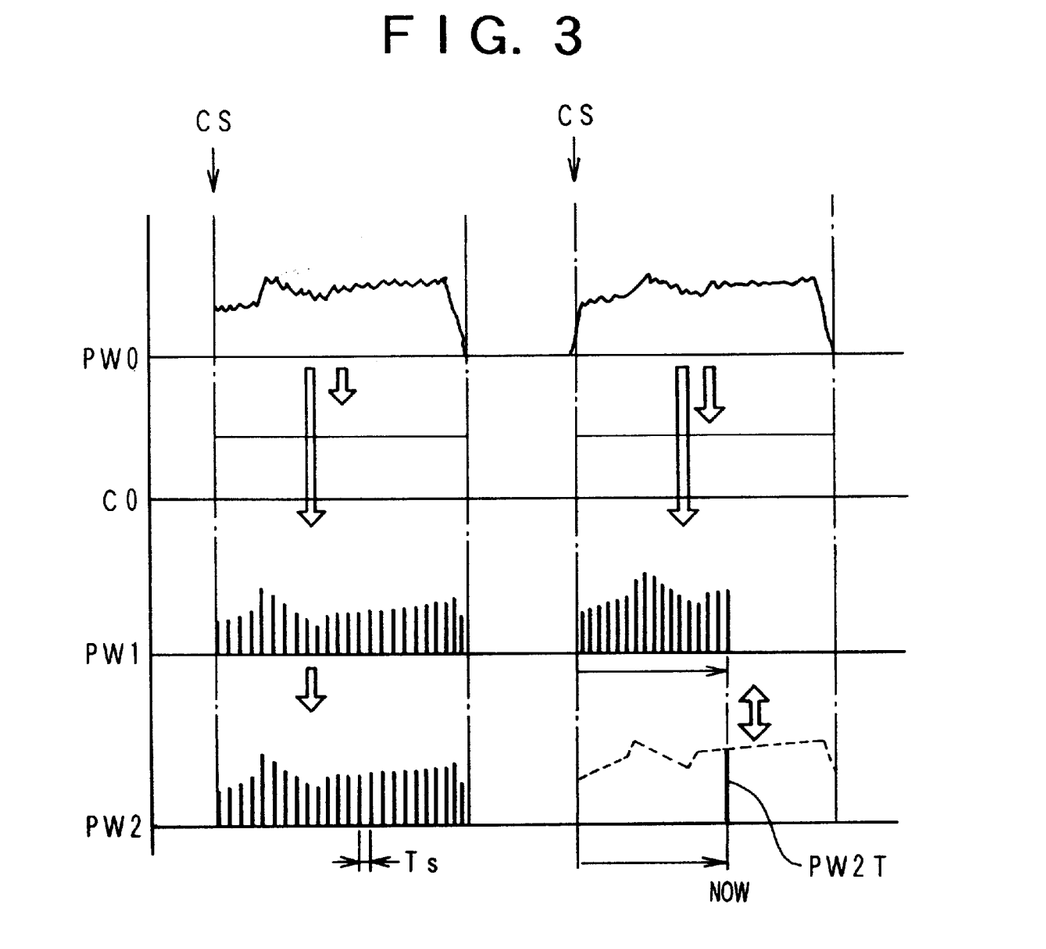
FIG. 3 is a graph showing a signal process in the preferred embodiment.

The reference-value stored area 52 stores the consumption power signals PW1, inputted from the input means 44, in due order from the start of the cutting process, detected in the cut-starting detector 51, under the defined conditions, and holds them as reference consumption-power signals PW2 (see the left side of FIG. 3).

The predetermined conditions for storing are obtained from the first process when the work piece or the processing steps are changed (obtained from the NC system 20) and so on, which is set with the operation program carried out by the CPU 41.

The reference-value stored area 52 stores the consumption power (the reference consumption power), used by the tool 12 without wear cutting the predetermined work piece, as time-series data from the start of the cutting process.

The memory for the reference consumption-power signal PW2 is carried out by reserving reference-value memory for the working memory 43 and memorizing while memory addresses are changed every time the consumption power signal PW1 is sent, or the other ways.

The accord controller 53 paces off a lapse of time from the start of the process, detected by the cut-starting detector 51, to the present time under the defined condition, and then selects a reference consumption-power signal PW2T, corresponding to the lapse of time, from the reference-value stored area 52.

The predetermined condition for memorizing is when the reference-value stored area 52 does not carry out the memorizing operation, such as in the cutting processes from the second cutting process after the work piece or the processing steps are changed (obtained from the NC system 20), or the other times.

The comparing area 54 compares the reference consumption-power signal PW2T, selected by the accord controller 53, with the actual consumption power signal PW1 (see the right side of FIG. 3).

The comparison in the comparing area 54 is carried out by steps of resetting an address of the reference value memory reserved for the working memory 43 when the cutting process is started; reading the value in the aforementioned address of the reference value memory (the reference consumption-value signal PW2T) while the memory addresses are changed every time the actual consumption power signal PW1 is sent; and comparing the value in the aforementioned address with the actual consumption power signal PW1, or the other ways.

In the comparison, the comparing area 54 receives a threshold value Ns from the NC system 20 through the input circuit 45. And then, the comparing area 54 determines that the tool 12 is worn when the aforementioned threshold value Ns is smaller than the difference of the reference consumption-power signal PW2 and the actual consumption power signal PW1, and outputs the tool-replacing signal TC.

The tool-replacing signal TC is sent through the output circuit 46 to the NC system 20, and then the NC system 20 deals with the replacement tools or the like.

Worn Detection Process

The following process is carried out in the processing unit 34 of the worn detector 30 described above.

Figure 4:
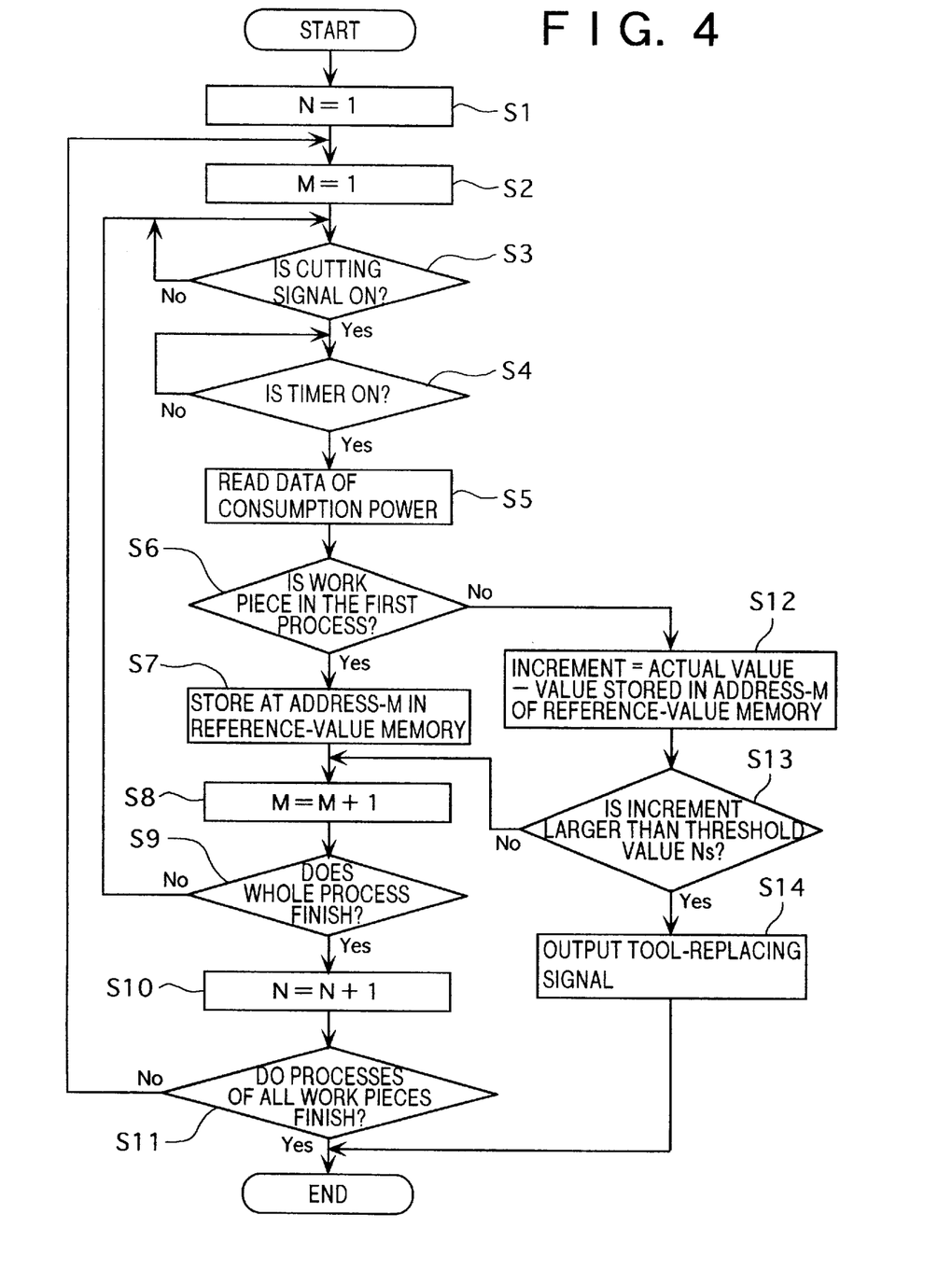
FIG. 4 is a flow chart showing a process for detecting wear in the preferred embodiment.

In FIG. 4, the cutting process is started, whereupon the number of work piece N=1 is defined (S1), and an address of the reference value memory M=1 is defined (S2). After the ongoing-cutting signal CO is detected (S3), the sampling-cycle Ts is measured (S4), and the consumption power PW1 is read (S5).

Where this is the first process (N=1), the setting process of the reference consumption power PW2 is selected (S6), the actual consumption power PW1 is stored in an address M of the reference-value memory (S7), and the addresses M are changed (S8).

In this point, it is determined whether a series of the process for the work piece finishes or not (S9). Where the series of the process does not finish, Steps S3 to S9 are repeated.

In the process described thus far, the consumption power PW1 created during the series of the first process is memorized as the reference consumption power PW2.

In Step 9, where the series of the first process finishes and the reference consumption power PW2 is obtained, the number of work pieces is increased (S10), and then, it is determined whether the process for all the work pieces is finished or not (S11). When the process for all the work pieces do not finish, the flow returns to Step S2 to carry out the second process.

In the second process, Steps S2 to S6 are performed as described above. And, address M=1 is defined in Step S2 again.

In Step S6, the second process is (N>1), so that the flow moves to Step S12.

More specifically, an increment between the actual consumption power PW1 and the value in address-M of the reference value memory is calculated (S12), and it is determined whether the calculated increment is larger than the threshold value Ns or not (S13).

Where the increment is larger than the threshold value Ns, the tool 12 is regarded as being worn, so that the tool-replacing signal TC is outputted (S14) and the whole process is stopped.

But, where the increment is smaller than the threshold value Ns, the flow returns to Step S8. And Steps S3 to S6, S12 to S13, and S8 to S9 are repeated until the whole process for the work pieces finishes, in which the worn detection is carried out in Steps S12 and S13 in the repeated flows.

After the second process finishes, the number of work pieces is changed in Steps 9 to 11 and the flow returns to Step S2 to carry out the third process. The third process is carried out as in the case of the second process described above, in which the worn detection is performed in Steps S12 and S13 in the repeated flow.

Effect of the Embodiment

According to the embodiment described thus far, the actual consumption power PW1 of the built-in motor 19, driving the main shaft 11, is watched and compared with the previously defined reference consumption power PW2, thereby when the consumption power PW1 becomes larger than the reference consumption power PW2 as the process is advanced, the wear of the tool 12 can be detected.

The main shaft 11 is supported in the air static-pressure bearings 14 to 18, so that noise created with rotating, which exert an influence upon the consumption-power detected value, is extremely smaller as compared with the conventional antifriction bearing and so on.

Therefore, it is allowed to detect even the delicate fluctuation of the consumption power, thus reliably carrying out the worn detection for the tool 12.

The consumption power PW0 of the built-in motor 19, created during the cutting process for the work piece, is converted to digital form by the A/D converter 32 to be the consumption power PW1, having the predetermined sampling cycle. And further, the reference consumption power PW2 is defined in the reference-value stored area 52 based on the consumption power PW1, created in the first process, and then the accord controller 53 suits the consumption power PW1 to the value positioned at the same time-point (the reference consumption power PW2T corresponding to the actual consumption power PW1). Thereby allowing the detecting precision in each of the sampling point to be ensured and the calculating process and so on to be simplified as compared with a process with the use of continuous values.

The reference value memory, especially, is reserved in the working memory 43, and the reserved address is moved to correspond to a sampling number counted from starting the process, thereby certainly carrying out the time-point accordance.

The start point of the cutting process for the work piece can be detected from the consumption power PW0, obtained from the load meter 31, by the comparator 33 and the cut-starting detector 51, so that the comparison of the actual consumption power PW1 and the reference consumption power PW2T, corresponding to the actual consumption power PW1, can be certainly carried out.

Therefore, the comparison of the actual value and the reference value of the consumption power can be performed under the same conditions in the sequence of the process, thus allowing the worn detection to ensure as compared with the use of an average value under various conditions, an average value of multiple processes, or the like.

Furthermore, an admissible differential value, inputted from the outside, is memorized and the wear on the tool 12 is regarded when the difference of the consumption power PW1 and the reference consumption power PW2 becomes larger than the threshold value Ns, so that the sensing control of the worn determination and so on can easily carried out by changing settings of the threshold value Ns.

The consumption power PW1, created when the first process is carried out for the predetermined work piece, is stored as the reference consumption value PW2, and compared with the consumption power PW1 of the continued second process, so that the reference value can be defined every time even when the steps for processing the work piece are diversified or it is difficult to previously define the reference value, thereby allowing the worn detection to be reliably and properly carried out.

Incidentally, the embodiment can be adapted to a breakage detection by partially changing the process shown in FIG. 4.

Figure 5:
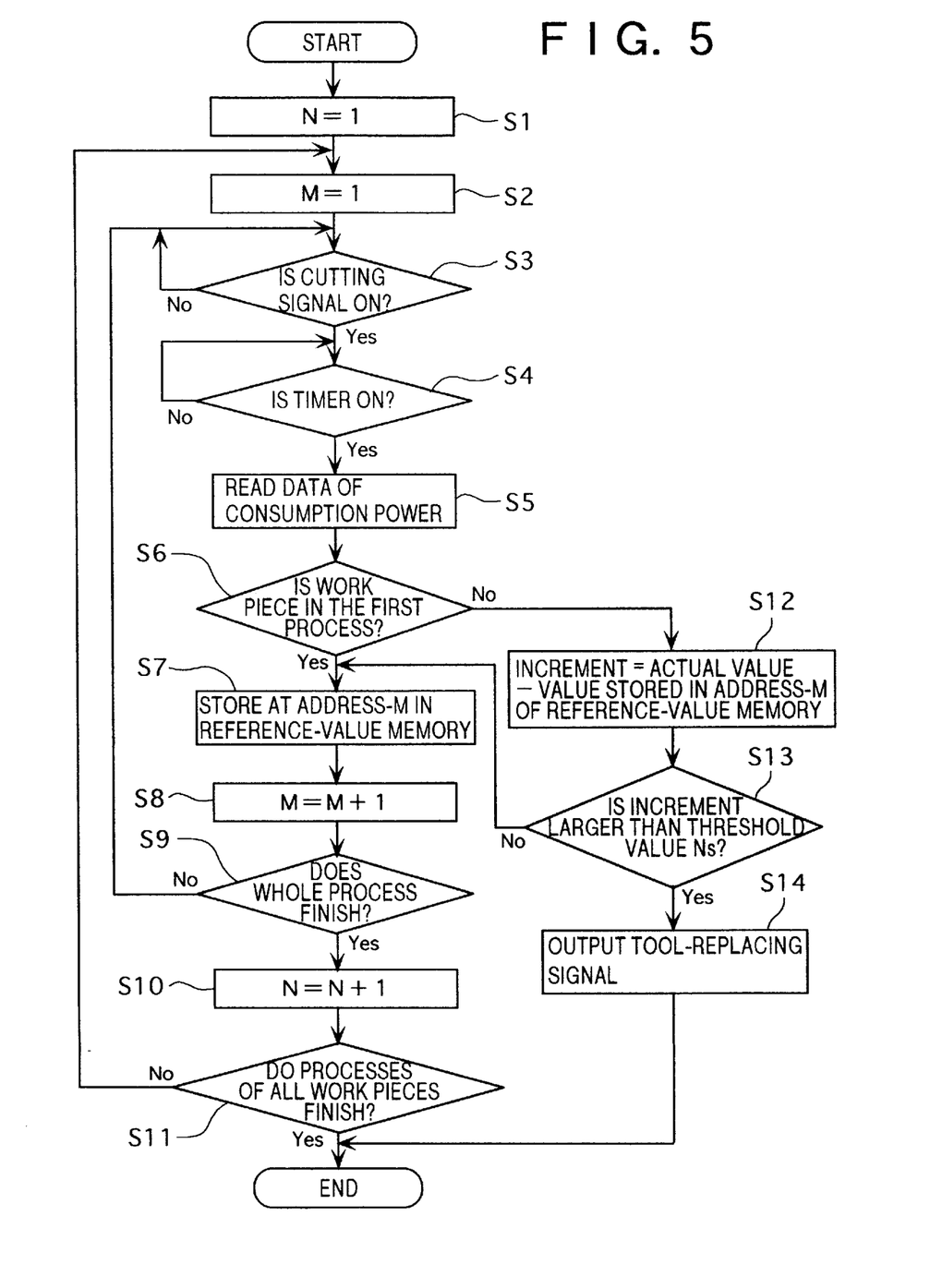
FIG. 5 is a flow chart showing a process for detecting breakage in the preferred embodiment.

FIG. 5 is basically similar to FIG. 4. The flow of FIG. 4 returns to Step S8 from Step S14 when the wear on the tool is detected, but the flow of FIG. 5 returns to before Step S7 from the same Step S14 as FIG. 4.

More specifically, in the second process, after the comparison of the reference consumption power PW2 and the actual consumption power PW1, where the wear on the tool is not detected (S13), the actual consumption power PW1 is rewrite as the new reference consumption power PW2 (S7).

As described thus far, the following consumption power is allowed to be compared in dependence on the consumption power of the preceding process, thus being the structure suitable for the breakage detection creating a large fluctuation.

The Other Embodiments

It is to be understood that the present invention is not intended to be limited to the aforementioned embodiment, and the following modification and so on are also included in the scope of the present invention.

In the aforementioned embodiment, the process as described above is unfolded on software by each of areas 51 to 54 in the processing unit 34, but each of the functions may be another structure capable of achieving the similar comparison.

The processing unit 34 is not limited to be performed with software by CPU 41 and so on, and may be wholly performed with hardware.

The worn detector 30 is not limited to carry out the comparison with a digital form by using the A/D converter 32 and the processing unit 34, and may be structured to carry out the comparing process with an unchanged analog signal, in the other words, it is required to structure to detect the wear by means of the comparison of the reference consumption power PW2 and the actual consumption power PW1.

In the comparing process, the time-point control of the lapsed time of the cutting process.

It is not limited for the time-point control of the lapsed time of the cutting process in the comparison to structure to detect the process start point from the fluctuation of the consumption by using the comparator 33 and the cut-starting detector 51, and another manner, such as conducting type touching detection or the like, may be employed.

The reference consumption power PW2 is not limited to be defined based on the consumption power PW1 of the first process, and may be defined by selecting from data, previously stored an external data base or the like, in response to the processed work piece.

In the aforementioned embodiment, the reference consumption power PW2T of the same time-point as the actual consumption power PW1 is compared by using a sampling unit. But, an average value of movement of the past N processes every the time-point, which is previously memorized, may be compared with an average value of the actual consumption power, similarly calculated, thereby allowing the stable worn detection to be carried out with the decrease of effect of external disturbance or noise although the process increases in complexity.

Further, when the actual consumption power PW1 is compared with the reference consumption power PW2, the use of the threshold value Ns is not absolutely necessary, and the wear may be determined when the consumption power PW1 exceeds the reference consumption power PW2 by means of the direct comparison, for example, the wear is determined at the time the excesses reach the predetermined number, thereby allowing the influence of noise or the like to be avoided.

After detecting the wear, in the aforementioned embodiment, the tool-replacing signal TC is outputs from the NC system 20, but the other ways, such as an alarm with audio or display or the like, may be used.

The following is an explanation as to the practical worn detection with the use of the aforementioned machine tool 1.

Figure 6:
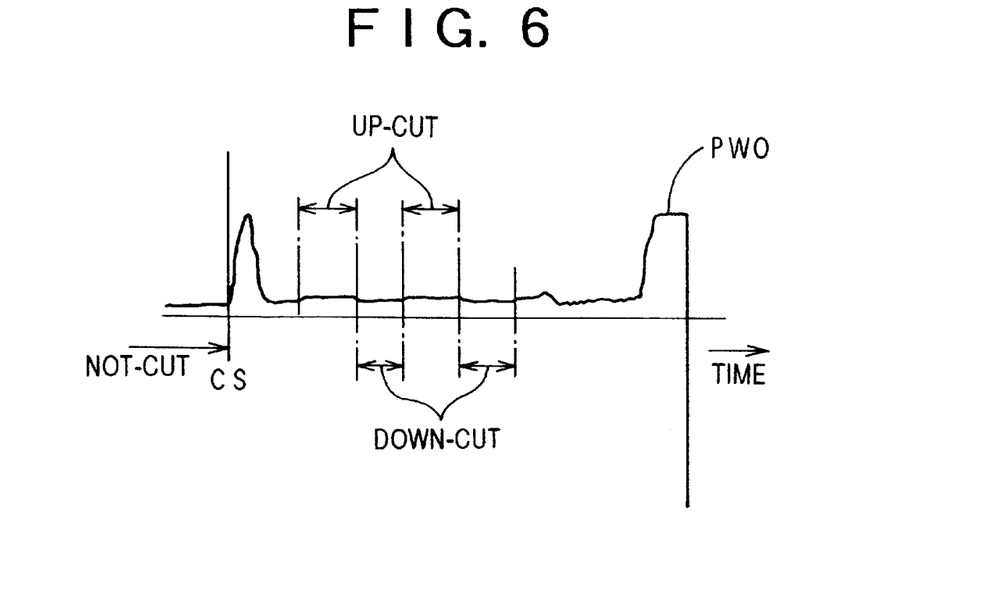
FIG. 6 is a graph showing consumption power in the use of a new tool in Experiment 1.
Figure 7:
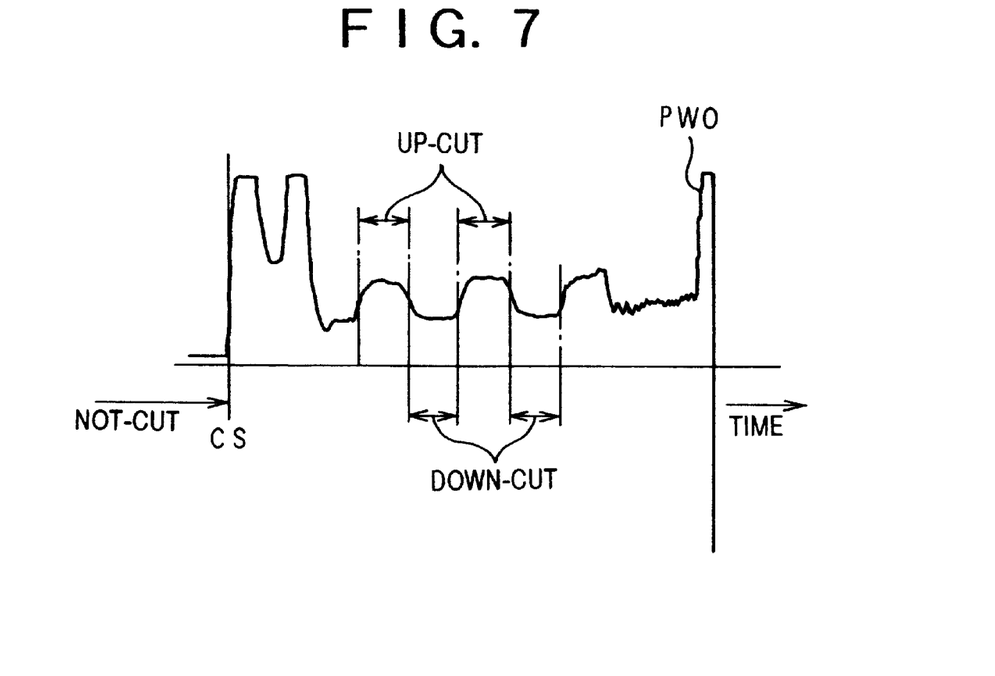
FIG. 7 is a graph showing consumption power when the tool is worn in Experiment 1.

Experiment 1
1. Substance of the process: a cage pocket process with an end mill, a end-mill diameter 3 mm, a reciprocating process, sending 2 M/min., pick-feed 0.6 mm, the depth 0.6 mm
2. The rotational speed of the main shaft: 30,000 rpm
3. Material of the work piece: HPM-1
4. Result of the experiment:
   The difference of power in up-cut and down-cut is not predominantly noticed when the tool is new (see FIG. 6). But as the tool becomes worn, the difference of power in up-cut and down-cut is remarkable (see FIG. 7).
   The difference of the signal levels between the new tool and the worn tool is around 70 W.

Figure 8:
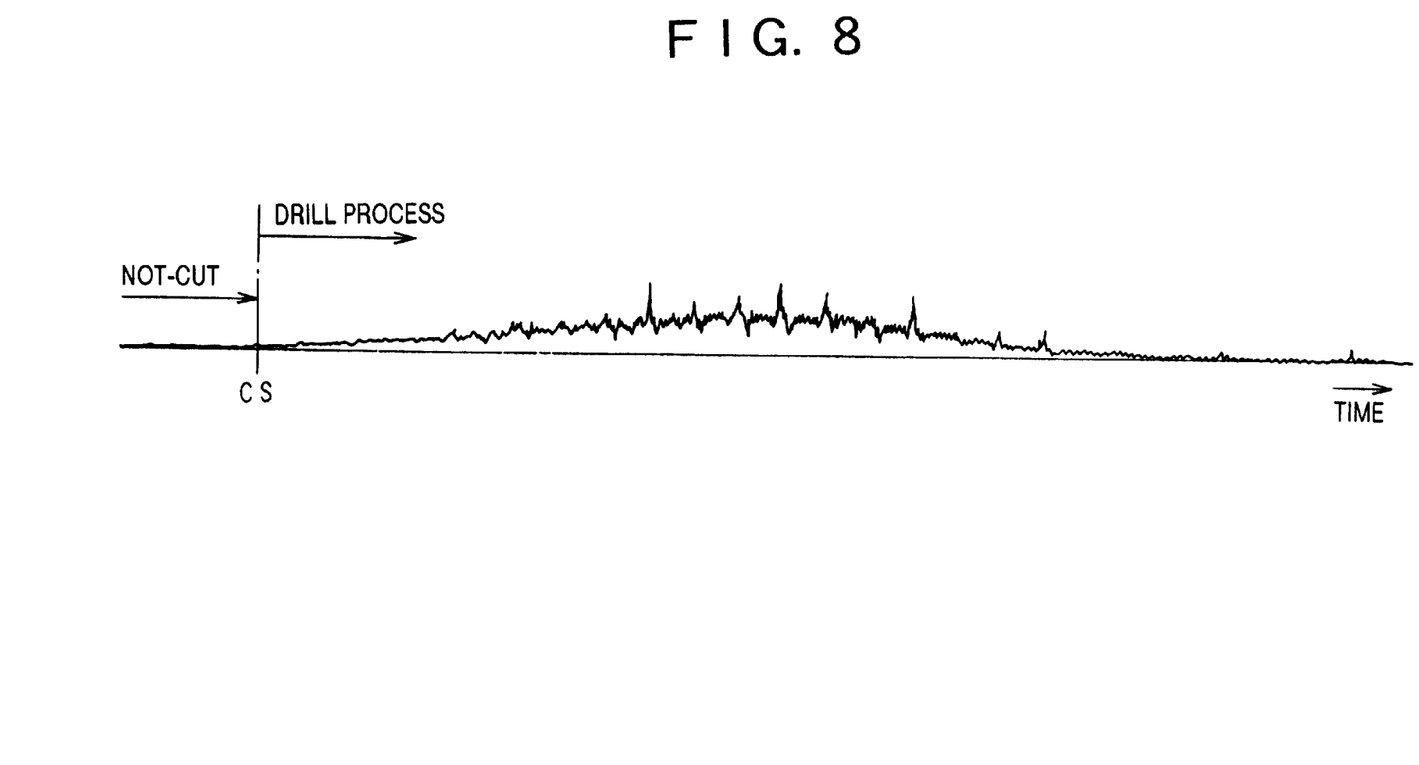
FIG. 8 is a graph showing consumption power in a process of Experiment 2.
Figure 9:
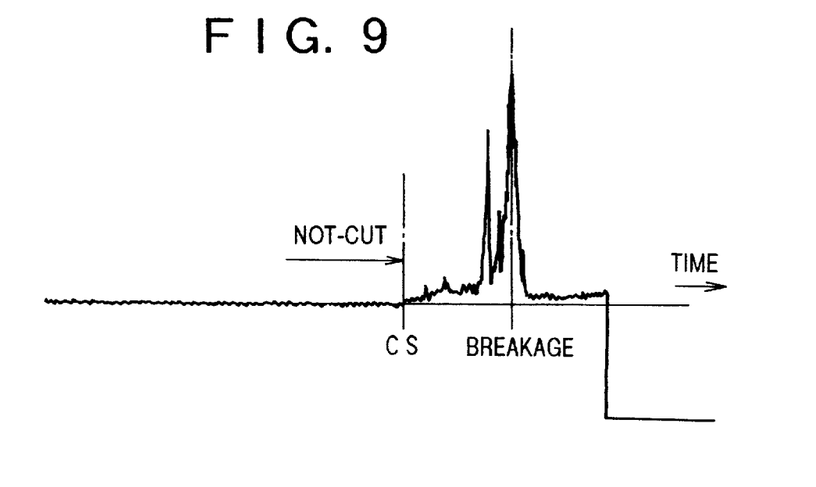
FIG. 9 is a graph showing consumption power in breakage of the tool in Experiment 2.

Experiment 2
1. Substance of the process: a drill process, a drill diameter 0.5 mm, a processed depth 10 mm, use of a water-soluble cutting agent
2. The rotational speed of the main shaft: 45,000 rpm
3. Material of the work piece: aluminum
4. Result of the experiment:
   Noise amplitude in the not-cut state is less than 0.04 W in terms of power, but the change of the signal level from the not-cut state to the cutting state is more than 1.2 W in terms of power, in which it is understood that noise is extremely low because of the air static-pressure bearing (see FIG. 8). The signal in breakage is more than 170 times of noise amplitude in the normally cutting state, in which it is understood that the ability of the breakage detection of the drill is sufficient (see FIG. 9).

Figure 10:
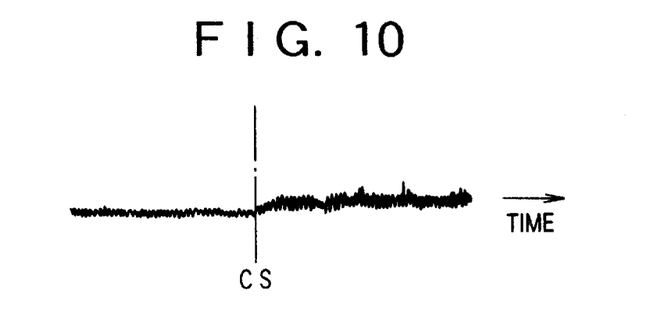
FIG. 10 is a graph showing consumption power in a process of Experiment 3.
Figure 11:
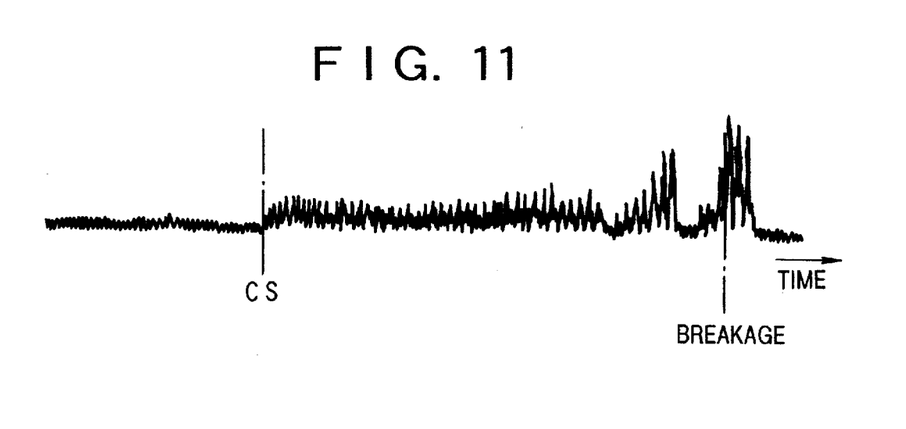
FIG. 11 is a graph showing consumption power in breakage of the tool in Experiment 3.

Experiment 3
1. Substance of the process: a drill process, the drill diameter 0.5 mm, a processed depth 12 mm, use of cutting fluid fogging
2. The rotational speed of the main shaft: 24,000 rpm
3. Material of the work piece: SKD12
4. Result of the experiment:
   Noise amplitude in the not-cut state is less than 0.17 W in terms of power, but the change of the signal levels from the not-cut state to the cutting state is more than 0.34 W in terms of power, in which it is also understood that noise is sufficiently low because of the air static-pressure bearing (see FIG. 10).
   The signal in breakage is more than 10 times of noise amplitude in the cutting state with the new drill, in which it is understood that the ability of the breakage detection of the drill is sufficient (see FIG. 11).

What is claimed is:

1. A machine tool with a worn detection function for a tool, comprising:
   a main shaft attached with the tool and supported by an air static-pressure bearing to be rotated;
   a shaft driving motor driving said main shaft to rotate;
   a consumption-power detection means for detecting consumption power of said shaft driving motor; and
   a worn-detection means for detecting wear on the tool by memorizing a reference consumption power of said shaft driving motor and comparing the reference consumption power with consumption power detected by said consumption-power detection means, wherein said worn-detection means includes a cut-starting detector for detecting the start of a cutting process for a predetermined work piece by using the consumption power obtained from said consumption-power detection means, a reference-value stored area storing the consumption power of said shaft driving motor during the cutting process for the predetermined work piece as time-series values in elapsed-time from the start of the cutting process and outputting the reference consumption power of the time points, an accord controller for fetching the reference consumption power corresponding to the present time from said reference-value stored area, based on the elapsed time from the start of the cutting process, detected by said cut-starting detector, to the present time, and a comparing area for comparing the reference consumption power fetched by said accord controller, with the present consumption power obtained from said consumption-power detection means, said reference-value stored area storing and said accord controller fetching the reference consumption power at predetermined sampling times.

2. The machine tool with the worn detection function for the tool according to claim 1, wherein said reference-value stored area and said accord controller store and fetch the reference consumption power at every predetermined sampling time inputted from the outside.

3. The machine tool with the worn detection function for the tool according to claim 1, wherein said worn-detection means memorize an admissible differential value, inputted from the outside, and determines that the tool is worn when a difference of the consumption power, detected by said consumption-power detection means, and the reference consumption power is larger than the admissible differential value.

4. The machine tool with the worn detection function for the tool according to claim 1, wherein said worn-detection mean; memorize the consumption power, obtained from said consumption-power detection means, as the reference consumption power when the first cutting process for a predetermined work piece is carried out.

5. The machine tool with the worn detection function for the tool according to claim 1, wherein said worn-detection means memorize the consumption power, obtained from said consumption-power detection means, as the new reference consumption power in each of cutting processes for the predetermined work piece.

6. A machine tool with a worn detection function for a tool, comprising:

a main shaft attached with the tool and supported by an air static-pressure bearing to be rotated;

a shaft driving motor driving said main shaft to rotate;

a consumption-power detection means for detecting consumption power of said shaft driving motor; and a worn-detection means for memorizing an admissible differential value, inputted from the outside, and a reference consumption power of said shaft driving motor, and determining that the tool is worn when a difference of the reference consumption power and the consumption power, detected by said consumption-power detection means, is larger than the admissible differential value, and wherein said worn-detection means includes a cut-starting detector for detecting the start of a cutting process for a predetermined work piece by using the consumption power obtained from said consumption-power detection means, a reference-value stored area storing the consumption power of said shaft driving motor during the cutting process for the predetermined work piece as time-series values in elapsed-time from the start of the cutting process and outputting the reference consumption power of the time points, an accord controller for fetching the reference consumption power corresponding to the present time from said reference-value stored area, based on the elapsed time from the start of the cutting process, detected by said cut-starting detector, to the present time, and a comparing area for comparing the reference consumption power fetched by said accord controller, with the present consumption power obtained from said consumption-power detection means, said reference-value stored area storing and said accord controller fetching the reference consumption power at predetermined sampling times.

7. A machine tool with a worn detection function for a tool, comprising:

a main shaft attached with the tool and supported by an air static-pressure bearing to be rotated;

a shaft driving motor driving said main shaft to rotate;

a consumption-power detection means for detecting consumption power of said shaft driving motor; and a worn-detection means for memorizing an admissible differential value, inputted from the outside, and a reference consumption power of said shaft driving motor, and determining that the tool is worn when a difference of the reference consumption power and the consumption power, detected by said consumption-power detection means, is larger than the admissible differential value, the worn-detection means having a cut-starting detector detecting a start of a cutting process for a predetermined work piece by using the consumption obtained from said consumption-power detection means, a reference-value stored area storing the consumption power of said shaft driving motor, during the cutting process for the predetermined work piece, as time-series values in response to elapsed-time from at the start of the cutting process and outputting the reference consumption power of time points, an accord controller fetching the reference consumption power corresponding to the present time from said reference-value stored area on the basis of the elapsed-time from the start of the cutting process, detected by said cut-starting detector, to the present time, and a comparing area comparing the reference consumption power, fetched by said accord controller, with the present consumption power, obtained from said consumption-power detection means, so that said reference-value stored area and said accord controller store and fetch the reference consumption power at every predetermined sampling time inputted from the outside.

8. The machine tool with the worn detection function for the tool according to claim 7, wherein said worn-detection means memorize the consumption power, obtained from said consumption-power detection means, as the reference consumption power when the first cutting process for a predetermined work piece is carried out.

9. The machine tool with the worn detection function for the tool according to claim 7, wherein said worn-detection means memorize the consumption power, obtained from said consumption-power detection means, as the new reference consumption power in each of cutting processes for the predetermined work piece.

* * * * *